Nov. 22, 1932.    C. K. SALISBURY    1,888,638
DANDELION AND BUCKHORN HEADER
Filed Jan. 20, 1932    2 Sheets-Sheet 1
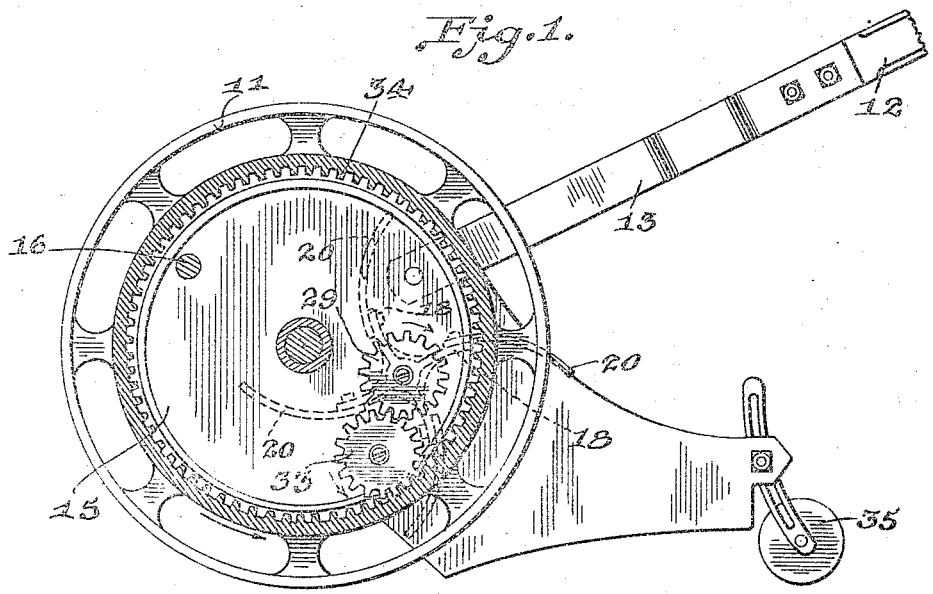
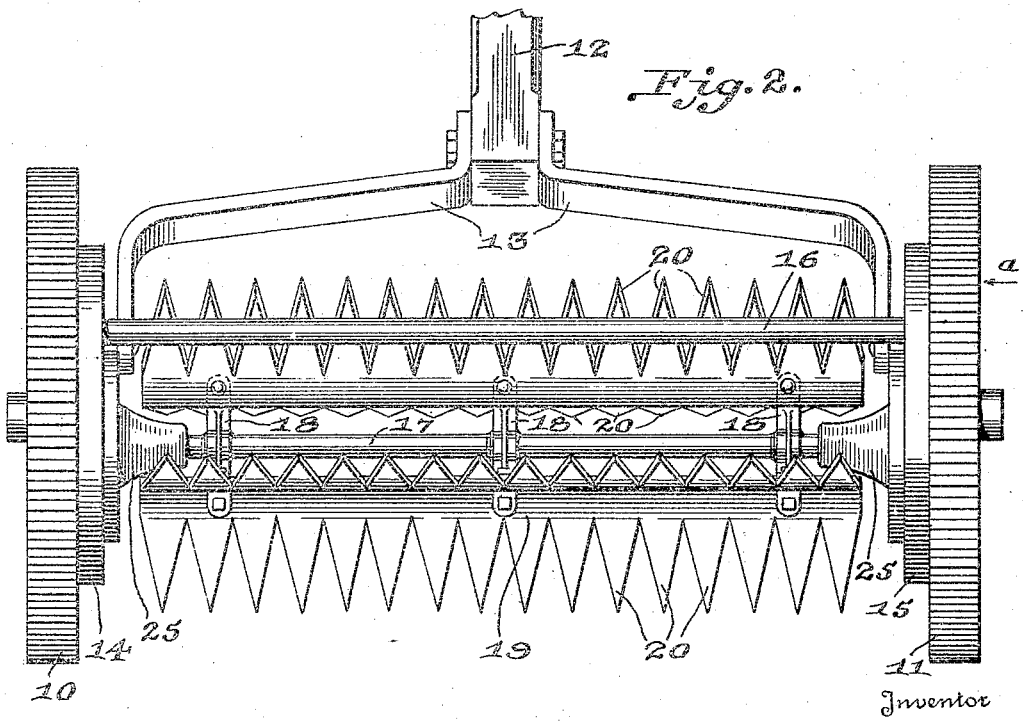
Inventor
Charles K. Salisbury
By Mawhinney & Mawhinney,
Attorneys Nov. 22, 1932.  C. K. SALISBURY  1,888,638
DANDELION AND BUCKHORN HEADER
Filed Jan. 20, 1932  2 Sheets-Sheet 2
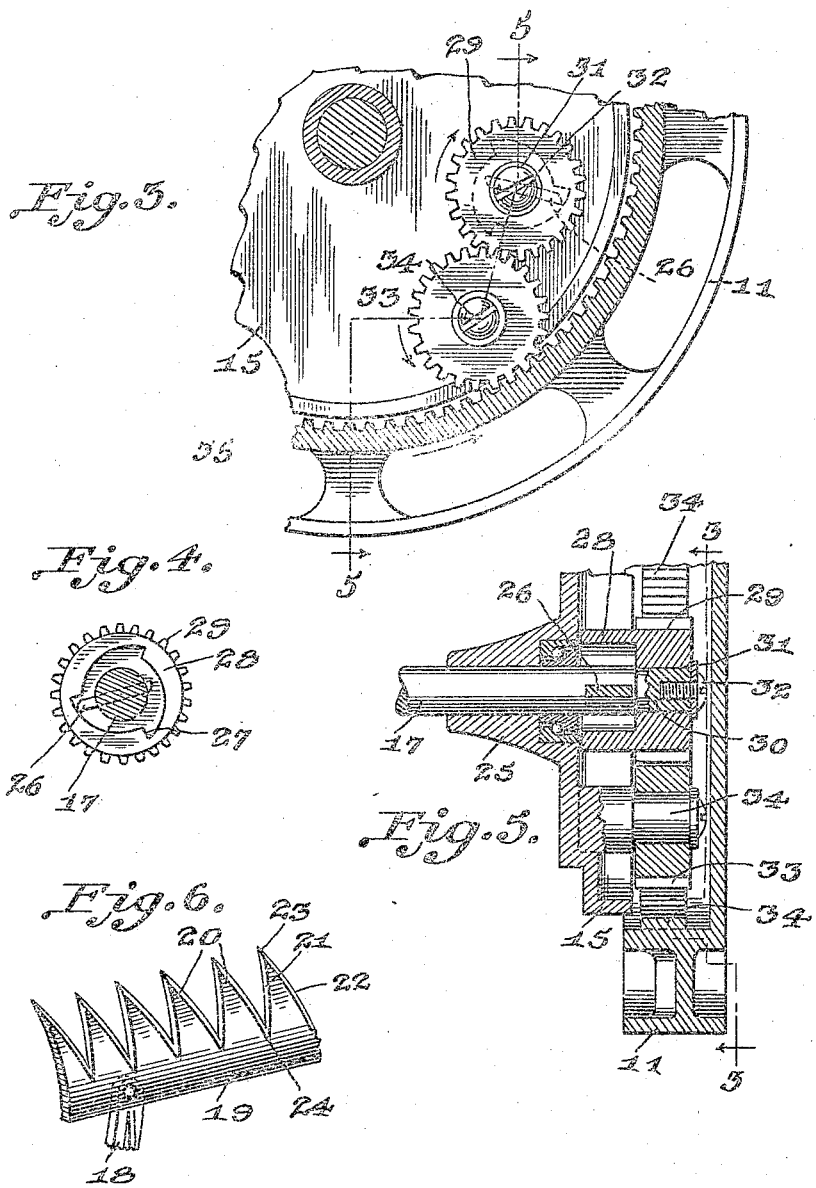
Inventor
Charles K. Salisbury
By Mawhiney & Mawhiney,
Attorneys Patented Nov. 22, 1932

1,888,638

UNITED STATES PATENT OFFICE

CHARLES K. SALISBURY, OF MOUNT VERNON, OHIO

DANDELION AND BUCKHORN HEADER

Application filed January 20, 1932. Serial No. 587,805.

The present invention relates to improvements in dandelion and buckhorn headers, and has for an object to provide a modified lawnmower or other implement having revolving blades or combs, which are adapted to behead dandelions and are useful in the extermination of many other kinds of weeds and in checking the growth and spread of the same.

Another object of the invention is to provide an improved device which will not only prevent the spread of the weed seed but tends in time to destroy the plant itself, whereby weeding of lawns may be facilitated.

A still further object of the invention is to provide an improved implement of this nature which, while beheading dandelions and like weeds, will not be injurious to the grass but in fact will assist in the cultivation of the soil and promote a much healthier condition.

A still further object of the invention is to provide a machine which is adapted for use on the fairways and roughs of golf courses either in a single unit propelled by hand, or a gang of units drawn by a tractor.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a lawnmower-like machine constructed in accordance with the present invention and showing one of the end housings in section to reveal the interior reverse gear construction.

Figure 2 is a plan view of the machine with the handle broken away.

Figure 3 is a section taken on an enlarged scale on the line 3—3 in Figure 5.

Figure 4 is a face view of the ratchet gear.

Figure 5 is a transverse section taken on the line 5—5 in Figure 3, and

Figure 6 is a fragmentary perspective view of the cutter or comb employed.

Referring more particularly to the drawings the improved machine is adapted from a lawnmower having the ground wheels 10 and 11, the handle 12, yoke 13 and fixed plates 14 and 15 inside the ground wheels to which the yoke is affixed. A brace bar is indicated at 16 extending between the plates remote from the yoke. The usual reel shaft is represented at 17 and carries the arms or spiders 18 by which the cutter bars of the lawnmower are customarily supported, but these cutter bars are dispensed with in the present instance and supplanted by combs 19 having teeth 20 extending therefrom. The teeth are preferably triangular in form having the outwardly convergent side walls 21 and 22 leading to a pointed apex 23. Between the teeth are the crotches 24. Although such combs and teeth may be straight, they are preferably curved in the manner indicated at dotted lines in Figure 1.

The reel shaft 17, as shown in Figure 5, is journaled in bearings 25 of the plates 14 and 15 and within one of the plates for instance plate 15 the end portion of the shaft carries a ratchet dog or key 26 lying within and cooperating with the ratchet teeth 27 formed upon the interior of a hollow hub or sleeve 28 carried upon the ratchet pinion 29.

This ratchet pinion 29 is mounted to revolve freely about a reduced extension 30 of the reel shaft 17 and the pinion 29 is confined in place by a disc 31 or other appropriate fastening removably held to the extension journal 30 as by a screw 32.

The pinion 29 meshes with an idler or intermediate reverse pinion 33 mounted on the stub shaft 34 carried within the fixed plate 15. The intermediate pinion 33 in turn meshes with an internal annnular rack 34 upon the ground wheel 11.

The lawnmower may also be equipped as shown in Figure 1 with the castor supporting wheel 35 or not as shown.

As many of the combs may be provided as necessary. The number of combs may for instance correspond to the number of the cutting blades removed from the lawnmower and as indicated in Figure 1 four such blades are provided.

In the operation of the device, the lawnmower is pushed by the handle 12 in the usual manner, the wheels 10 and 11 rolling along the ground in the direction of the arrow, indicated in Figure 3; or in a counter-clockwise direction This imparts a similar rotation to the intermediate pinion 33 and a reverse rotation, through the intermediate pinion, to the drive ratchet pinion 29.

The shoulders of the ratchet teeth 27 engaging the key 26 will cause rotation of the shaft 17 and rotation of the reel with the toothed combs thereon in a clockwise direction as viewed in Figures 1 and 3. Thus the blades 20 are moved downwardly, forwardly and upwardly with respect to the position and motion of the lawnmower. Such action causes the triangular spaces between the teeth 20 to close upon the stems of dandelions and other weeds and to subject such stems to the cutting action of the sharpened side edges 21 and 22 of the blades, which side edges converge upon the stem and cut the same through, so that the plants are beheaded before going to seed and the propagation of the weeds is thus arrested. The crotch 24 will also close upon the stems and exert a strong pulling force in case the stem is not severed. The heads, of course, will not be able to pass through the narrow spaces between the blades particularly at the crotches thereof and the heads will, therefore, serve to give an extremely strong hold upon the stems thus insuring the beheading of the plants. The fact that the heads are not permitted to pass between the blades will permit the carrying around of the same and the throwing of the heads in back of the machine.

When the lawnmower is pushed in the opposite direction or pulled the reel will run idly due to the ratchet mechanism in a manner similar to the lawnmower.

It is obvious that various changes and modifications may be made in the details of construction and design of the above specifically described embodiment of this invention without departing from the spirit thereof, such changes and modifications being restricted only by the scope of the following claims.

What is claimed is:—

1. A weeding machine comprising a roller frame, and a rotary comb carried and driven by said roller frame and having cutter teeth movable forwardly against the stems of the weeds.

2. A weeding machine comprising a comb movable relatively to said frame and having cutter teeth constructed and positioned to engage the stems of the weeds, and means on the frame to cause the teeth to move forwardly with reference to the frame as the frame is moved forwards.

3. A weeding machine comprising a roller frame, a revolving reel carried on said frame, and a comb on the reel having teeth with substantially triangular spaces therebetween.

4. A weeding machine comprising a roller frame, a revolving reel on the frame, and a comb on the reel having cutter teeth with inclined sharpened edges.

5. A weeding machine comprising a roller frame, a revolving reel on the frame, and a comb having teeth of substantially triangular form having outwardly convergent sharpened side edges meeting in an outer apex and an inner crotch.

6. A weeding machine comprising a roller frame, a revolving reel on the frame, and a comb on the reel having curved triangular teeth with triangular spaces between the teeth.

7. A weeding machine comprising a roller frame, a revolving reel, ratchet drive mechanism for the reel, and a comb on the reel having flat cutter teeth with sharpened side edges driven downwardly, forwardly and upwardly as the machine moves forward.

8. A weeding machine comprising a roller frame, and a rotary dandelion beheading device supported for rotation about its own axis on said roller frame and having cutter teeth thereon moving in a direction counter to the rolling motion of the rollers of the frame, the cutter teeth at their lowest point of rotational travel being spaced above the ground over which the roller frame is moved whereby not to dig into the ground but to sever the stems of the dandelion or the link below the heads thereof.

9. A weeding machine comprising a roller frame, and a rotary comb carried and driven by said roller frame, said rotary comb having cutter teeth rotated in a direction counter to the rolling motion of the rollers of the frame, said cutter teeth at their lowest points being spaced above the ground whereby not to dig into the ground.

10. A dandelion and buckhorn header, comprising a roller frame, a rotary cutting device carried and driven by said roller frame in a direction of rotational movement counter to that of the rollers of the frame, said rotary cutting device having flat cutter bars thereon with numerous teeth extending from said cutter bars and having lateral sharpened and inclined cutting edges, the free ends of said teeth being spaced at their lowest points above the ground.

11. A dandelion and buckhorn header, comprising a roller frame, a movable beheading device carried and driven by said roller frame and having a plurality of curved bars thereupon with numerous laterally spaced teeth also partaking of the curved form of the bars and having reduced free points with diverging sharpened side edges, said points being above the ground in all positions of the device.

In testimony whereof I affix my signature.

CHARLES K. SALISBURY.